P. L. HULIN.
PREPARATION OF ANHYDROUS METALLIC CHLORIDS.
APPLICATION FILED MAR. 5, 1918.
1,304,567.
Patented May 27, 1919.
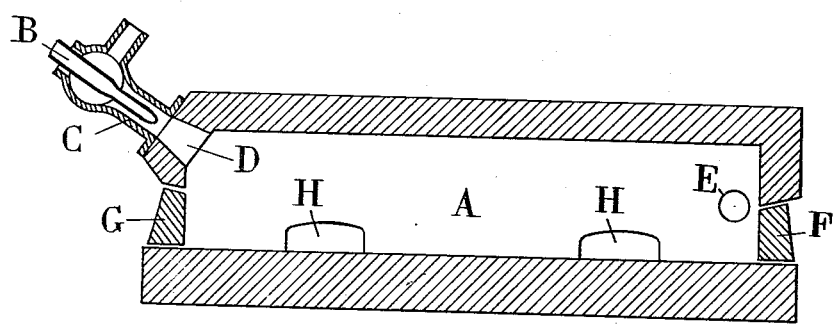

UNITED STATES PATENT OFFICE.

PAUL LÉON HULIN, OF GRENOBLE, FRANCE.

PREPARATION OF ANHYDROUS METALLIC CHLORIDS.

1,304,567.   Specification of Letters Patent.   Patented May 27, 1919.

Application filed March 5, 1918. Serial No. 220,640.

*To all whom it may concern:*

Be it known that I, PAUL LÉON HULIN, engineer, of 6 Rue Felix Poulat, Grenoble, Isere, France, have invented Improvements in the Preparation of Anhydrous Metallic Chlorids, of which the following is a full, clear, and exact description.

This invention relates to an improvement in known processes for dehydrating metallic chlorids and more particularly for converting hydrated magnesium chlorid into anhydrous chlorid suitable for use in the preparation of metallic magnesium.

It is known that certain hydrated chlorids, particularly those of magnesium and cerium, on being heated, decompose, giving off hydrochloric acid and leaving a residue of oxychlorid.

Such decomposition must be prevented or sufficiently reduced, and among the methods for attaining this end, is that which consists in heating the hydrated chlorid in a current of gaseous hydrochloric acid and the method in which ammonium chlorid is added to and incorporated with the chlorid to be dehydrated, and the present invention is an improvement in the first of these methods.

The carrying out on a large scale of a process in which gaseous hydrochloric acid is employed presents practical difficulties inasmuch as the apparatus used become rapidly destroyed owing to the fact that they are submitted on the one hand to the heating action and on the other hand to the action of the gaseous hydrochloric acid; moreover, the plant as a whole is of a complicated character and can with difficulty be kept water- or gas-tight.

The initial preparation of the gaseous hydrochloric acid in a sufficiently dry and pure condition furthermore necessitates the employment of large plant, involving considerable expense in construction, upkeep, etc.

The present invention renders the method of dehydrating chlorids by means of gaseous hydrochloric acid as a whole a very simple one. According to this invention, a layer of hydrated chlorid is placed in a chamber made of refractory material and suitably lined and protected on its exterior. The chlorin and hydrogen in approximately equal volumes are combined together by delivering them separately by means of suitable twyers which cause them to meet in a common conduit wherein they are ignited. This conduit, which is made of refractory material, debouches into the chamber which contains the chlorid to be dehydrated and delivers on to said chlorid and within the chamber the gaseous hydrochloric acid which thus contains in itself the necessary heat for evaporating the water contained in the chlorid; thus no exterior or additional heating is necessary for, in the operation above described, the combination of the hydrogen and chlorin furnishes simultaneously the preserving agent (*i. e.* the gaseous hydrochloric acid) for the chlorid to be dehydrated, and the dehydrating agent (*i. e.* the heating means).

It is obvious that the combination of the hydrogen and of the chlorin may be effected either in the chamber itself, which contains the chlorid to be dehydrated, or in another vessel connected with the chamber by a suitable conduit.

After having charged the apparatus, the temperature is gradually raised by varying the delivery and, if necessary, the composition of the gaseous mixture, without reaching, however, the fusion point of the chlorid being treated.

Chlorin gas, in excess relatively to the hydrogen, may be passed into the chamber, this having the advantage of lowering the temperature of the combination and of insuring the entire utilization of the hydrogen.

The gaseous hydrochloric acid, laden with aqueous vapor and in some cases with chlorin, is passed out of the desiccation chamber and collected by any convenient means, such as for example by condensation in water, the chlorin remaining being absorbed by hydrated lime or in any other manner.

In order to obviate excessive local heating in those parts wherein the synthetic gaseous hydrochloric acid is formed, or delivered, into the chamber, there may be added to said gas, before it comes into operation, a suitable proportion of previously prepared hydrochloric acid gas, that is to say, not prepared by the combination previously described. Previously prepared gaseous hydrochloric acid may also be added to the hydrogen or to the chlorin for the purpose of diluting them and of lowering the temperature of their combination.

These dilutions with an excess of chlorin or better with gaseous hydrochloric acid, also usefully increase the gaseous volume which insures the preservation of the chlorid to be dehydrated.

The previously prepared gaseous hydrochloric acid, which may be used for the purposes of addition or of dilution as above described, is preferably taken from the gases which are passed out of the apparatus, a portion of the gas passed out during the operation being returned to the inlet twyers. On its return journey the gaseous hydrochloric acid thus reëmployed is passed over sulfuric acid which retains the water drawn through.

The electrolytic production of caustic soda may economically provide the necessary chlorin and hydrogen, synthetic hydrochloric acid being obtained as by-product.

It is of course desirable that the chlorid to be dehydrated should be stirred while it is submitted to the calorific and chemical actions of the nascent hydrochloric acid, the stirring being effected by any suitable means.

For carrying out the process in practice, use may be made of various kinds of chambers or retorts, burners, twyers and accessories.

By way of example and solely for explanatory purposes, I have illustrated diagrammatically in the accompanying drawing the essential parts of an apparatus suitable for carrying out the process of the present invention. In this drawing, A is a chamber made of silico-aluminous or similar refractory material; B the twyers, which may be made of fused silica, for leading-in the hydrogen; C the inlet, which may be made of refractory material, of suitable pottery, or the like, for the chlorin; D the opening, leading to the chamber, wherein the gases are mixed and ignited; E the outlet for the gaseous hydrochloric acid formed and for the aqueous vapors resulting from the dehydration process; F a door for passing in the hydrated chlorid; G a door for removing the anhydrous chlorid; H, H lateral openings for enabling the material to be stirred.

The operation may be carried out in a rotary furnace which may be made suitable for the purpose.

The present process is applicable to all those chlorids which, when heated, decompose, liberating gaseous hydrochloric acid and leaving an oxychlorid as a residue.

This process is thus particularly suitable for the preparation of anhydrous magnesium chlorid and may equally well be used for chlorids of cerium, chromium, iron, etc. The chlorid to be dehydrated, before being treated in accordance with the process above described, may be partially dehydrated by a regulated (that is to say limited) heating operation.

The regulated heating of hydrated chlorids, particularly of the crystallized magnesium chlorid ($MgCl_2$, $6H_2O$) enables the removal of a relatively large proportion of water before any detrimental decomposition takes place. This initial partial dehydration is greatly facilitated and may enable approximately half the water of crystallization to be removed if the operation is carried out under a vacuum, as by these means a lower temperature may be used than under atmospheric pressure.

The partial dehydration of chlorids, either within a vacuum or under atmospheric pressure, is known and is of current application.

The characteristic feature of this second method of operating in accordance with the above process consists in combining an initial dehydrating operation with regulated heating with the dehydration process above described, which constitutes the basis of the present invention, so as to submit to the action of the synthetic gaseous hydrochloric acid a chlorid which has been freed of the greater part of the water which may be initially removed without decomposing said chlorid, this initial partial dehydration being effected by initially heating the chlorid to be treated, preferably under a vacuum and in the neighborhood of the temperature where decomposition would begin.

Claims:

1. A process for the preparation of anhydrous metallic chlorids by the action of gaseous and hot hydrochloric acid on the hydrated chlorid, consisting in operating the formation of the hydrochloric acid in communication with the chlorid to be de-hydrated by causing hydrogen and chlorin to combine in proximity to said chlorid, so as to apply, by direct contact, the heat evolved by the reaction to the evacuation of the water contained, the hydrochloric acid thus formed insuring at the same time the preservation of the chlorid.

2. A process for the preparation of anhydrous metallic chlorids by the action of gaseous and hot hydrochloric acid on the hydrated chlorid, consisting in operating the formation of the hydrochloric acid in communication with the chlorid to be de-hydrated by causing hydrogen and chlorin to combine in proximity to said chlorid, the chlorin being admitted in excess with respect to the hydrogen, for the purpose of absorbing all the latter and as well to lower the temperature of the reaction or to increase the preservative action of the gases which act upon the chlorid under treatment.

3. A process for the preparation of anhydrous metallic chlorids by the action of gaseous and hot hydrochloric acid on the hydrated chlorid, consisting in operating the formation of the hydrochloric acid in communication with the chlorid to be de-hydrated by causing hydrogen and chlorin to combine in proximity to said chlorid and in introducing in the apparatus, together with synthetic hydrochloric acid, hydrochloric gas already formed.

4. A process for the preparation of anhydrous metallic chlorids by the action of gaseous and hot hydrochloric acid on the hydrated chlorid, consisting in operating the formation of the hydrochloric acid in communication with the chlorid to be de-hydrated by causing hydrogen and chlorin to combine in proximity with said chlorid and in introducing in the apparatus, together with the synthetic hydrochloric acid, hydrochloric gas already formed supplied by the return of a portion of that which has issued from the apparatus.

5. A process for the preparation of anhydrous metallic chlorids in two combined phases: the first one consisting in subjecting the chlorid to be treated to a de-hydration, limited to a portion of the water contained therein, by means of a heating, the second phase consisting in treating the chlorid, which has been subjected to this previous partial dehydration, with hydrochloric acid formed in communication with said chlorid, by causing hydrogen and chlorin to combine in proximity to the latter.

6. A process for the preparation of anhydrous metallic chlorids in two combined phases: the first one consisting in subjecting the chlorid to be treated to a de-hydration, limited to a portion of the water contained therein, by means of a heating effected with the coöperation of a vacuum, the second phase consisting in treating the chlorid, which has been subjected to this previous partial dehydration, with hydrochloric acid formed in communication with said chlorid, by causing hydrogen and chlorin to combine in proximity to the latter.

7. The process of producing dehydrated metallic chlorids which comprises producing hydrochloric acid, utilizing the acid to maintain a hydrated metallic chlorid as a chlorid and the heat of combination of the acid to dehydrate the hydrated chlorid, substantially as described.

The foregoing specification of my "Improvement in the preparation of anhydrous metallic chlorids" signed by me this 30th day of January 1918.

PAUL LÉON HULIN.

Witnesses:
CHAS. P. PRESSLY,
FRANÇOIS WEBER.